Oct. 20, 1964   F. S. FLICK   3,153,539
PISTON ROD SEAL AND CYLINDER HEAD ASSEMBLY
Filed May 31, 1960
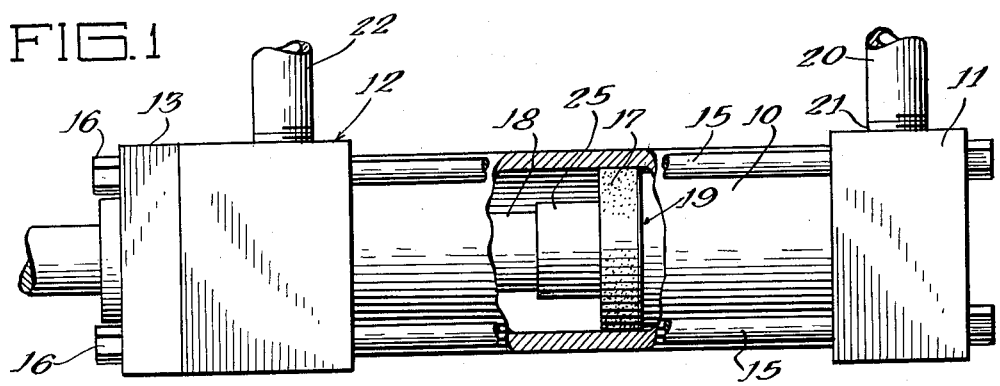
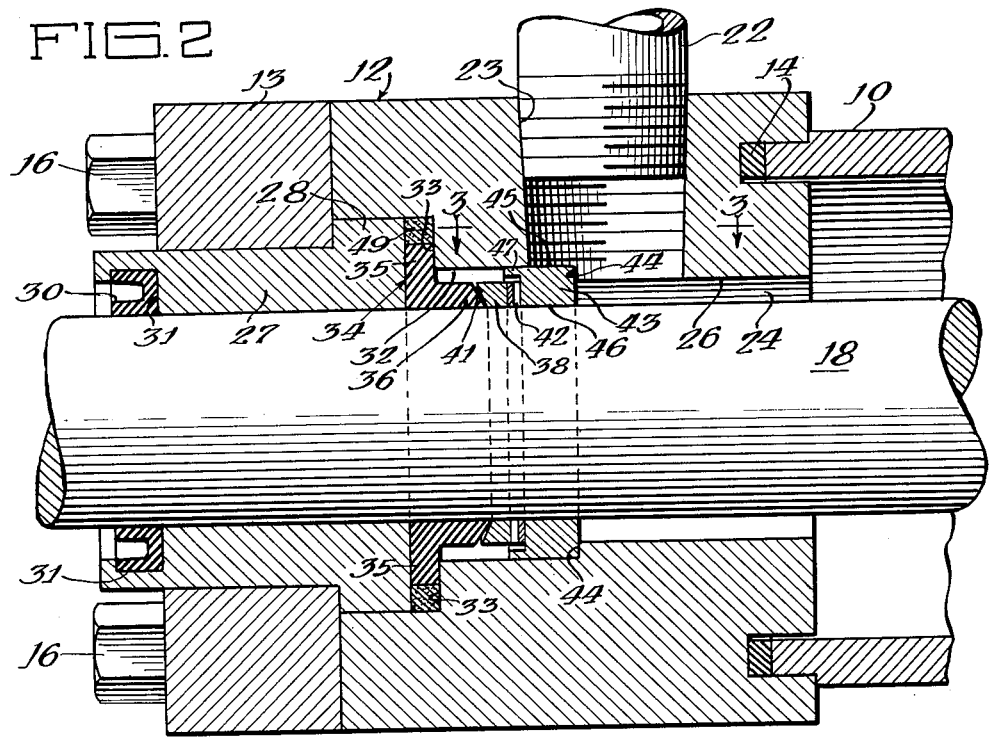
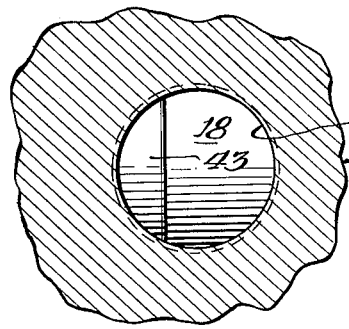
Inventor:
Francis S. Flick
By: Hofgren, Brady, Wegner,
Allen & Stellman
Attorneys United States Patent Office 3,153,539
Patented Oct. 20, 1964

1

3,153,539
PISTON ROD SEAL AND CYLINDER HEAD
ASSEMBLY
Francis S. Flick, Oak Park, Ill., assignor to Flick-Reedy
Corporation, a corporation of Illinois
Filed May 31, 1960, Ser. No. 32,671
7 Claims. (Cl. 277—70)

This invention relates to a hydraulic or pneumatic piston and cylinder device and more particularly to a piston rod seal and cylinder head assembly for such a device which provides leak-proof operation even during sudden severe drops in cylinder pressure and facilitates damage-free disassembly and assembly of the cylinder and seal while in the field.

This invention is particularly applicable to precision made hydraulic cylinders having a piston rod reciprocating through at least one head, the head carrying a piston rod seal construction of accurately dimensioned parts. The seal has the ability to prevent leakage of fluid along the rod and to wipe the piston rod dry. The rod seal referred to is of a type having a lip self-urged or mechanically urged into engagement with the piston rod to provide a continuous sealing contact and a dry rod beyond the seal.

A problem has been encountered where the hydraulic cylinder is connected to a workload which is suddenly released in the course of operation as may occur in a hydraulic press. The sudden release of the workload may cause a corresponding sudden severe drop in cylinder pressure. The sudden drop in pressure may adversely affect the rod seal by allowing the flexible lip portion in sealing engagement with the rod, to move away from the rod momentarily as hydraulic fluid surrounding the seal responsively surges away from the seal. The rod may not properly function for the duration of such a pressure adjustment within the cylinder allowing some oil or other hydraulic fluid to pass the seal along the rod. Any drops of oil allowed to escape the cylinder through the rod seal are extremely undesirable in any environments and with equipment on which the cylinder may be mounted.

Another problem concerns damage occurring to such aforementioned seals and their parts during placement of the seal structure of the cylinder. Much of the damage may occur while attempting to replace a seal structure, due to the difficulty of supporting a heavy rod centered in the head of the cylinder. Damage to small parts may often result from an unsupported or inaccurately supported piston rod which is permitted to rest on the seal parts prior to placement of a piston rod bushing or bearing in place in the head structure. This condition may occur in the servicing of many hydraulic and pneumatic cylinders since bushings which concentrically support the piston rod within the cylinder head are generally located on the outside of the seal with the seal between the bushing and interior of the cylinder. Therefore, when the outer parts of the cylinder, such as for example, a bushing retainer-plate and a piston rod bushing, are slipped off the end of a piston rod to gain access to the rod seal, the piston rod may be left unsupported within the cylinder head bore. The rod must be supported outside of the cylinder while a replacement seal is located in the head of the cylinder and any inaccuracy in centering the rod in the head may result in damage to the seal parts prior to replacement of the piston rod bushing.

The primary object of this invention is to provide a new and improved piston rod seal and cylinder head assembly.

Another object is to provide a piston rod seal and cylinder head assembly having structure which reduces and eliminates fluid pressure surges in the area of the piston rod seal which might otherwise occur in response to a cylinder pressure drop. The structure is capable of reducing the effect of any surge in the area about the rod seal

2 in order to prevent interference with the efficient operation of the piston rod seal.

A further object is to provide structure between the piston rod seal and cylinder interior to accurately and concentrically support the piston rod during disassembly and reassembly of the cylinder while in the field, thereby preventing damage to any part of the piston rod seal.

Other objects, features and advantages of the present invention will be understood from the following description of a preferred embodiment illustrated in the accompanying drawings in which:

FIGURE 1 is a side elevational view of a piston and cylinder device embodying my invention, partly broken away in order to show the structure of the piston therein;

FIGURE 2 is an enlarged fragmentary sectional view on a vertical median plane through the cylinder head as shown in FIGURE 1; and FIGURE 3 is a fragmentary sectional view taken substantially along line 3—3 of FIGURE 2 looking toward the interior of the cylinder in the area of the fluid port opening.

The piston and cylinder device chosen for purposes of illustrating the invention is a precision made cylinder device for use with a high pressure hydraulic operating medium. In general the parts of the piston and cylinder include a cylinder tube 10 joined at one end to a cap 11 and at the other end with a head 12 against which a retainer plate 13 bears. The cylinder tube is sealed to the head and cap and includes the use of a flexible sealing material 14. A plurality of tie-rods 15 pass through the cap, head and retainer plate and are provided with nuts 16 bearing on the outer surfaces of the cap and plate for holding the parts in assembled relation as illustrated in FIGURE 1. In this instance, the tie-rods are four in number, the head and cap being square in shape with the tie-rods in the corners.

A piston 19 is reciprocally mounted within the cylinder tube 10 and cup seals 17 are held on the piston for sealing against the inner surface of the tube. The piston is mounted on a piston rod 18 having an outer threaded end (not shown) for attachment to a device to be moved. The cylinder itself is shown without mounting structure which may be provided to support the cylinder in desired position.

Hydraulic fluid for moving the piston within the cylinder may be admitted to either side of the piston. A hydraulic conduit 20 threadably connected to a port 21 in the cap 11 is provided for conducting fluid to the right-hand side of the piston illustrated in FIGURE 1. A similar conduit 22 threadably connected to port 23 is provided in the head 12 for conducting fluid to the left-hand side of the piston. Port 23 communicates with a passage 24 through the head 12 defined by a stepped bore and partially occupied by the piston rod. A cushion plunger 25 mounted on the piston rod may enter the inner end and smaller portion 26 of the stepped bore for retarding the movement of the piston near the end of its stroke.

The cylinder head structure is illustrated more fully in FIGURE 2, wherein the piston rod passes through the stepped bore in the head leaving space for fluid flow about the piston rod. A piston rod bushing 27 is centered in the head 12 by the reception of the flange 28 thereon in the larger portion of the stepped bore in the head. A retainer plate 13 holds the piston rod bushing 27 in the head and bushing seal 49 is fitted in the outermost portion of the stepped bore to seal between bushing 27 and head 12. A dirt wiper 30 engaging the piston rod 18 is located in a recess 31 in the outer end of the bushing 27. The intermediate portion 32 of the stepped bore is joined to the larger end thereof by a radial shoulder 33. The elements of the piston rod seal are applied in the stepped bore so that the bushing 27 clamps the seal against the shoulder 33 with some seal elements extending into the intermediate bore 32.

The piston rod seal is an annular flange packing 34 seated about the piston rod with an annular radially directed flange 35 seated against the step 33 and the piston rod bushing when the parts are clamped together. Packing 34 is formed of any suitable flexible material such as leather, rubber, synthetic plastics, or the like. An integral lip portion 36 of the packing is beveled at its forward end with the extremity intended to have line contact with the piston rod.

The metallic parts of the rod seal structure insure that the lip of the seal packing maintains contact with the rod. Positioned over the piston rod 18 is a metal pressure ring 38, preferably of bronze, having a close fit on the piston rod so as to urge the extremity of the lip portion 36 against the rod. The pressure ring has a beveled surface 41 facing the lip and making an angle with respect to the axis of its bore which is a few degrees greater than the angle of the bevel on the packing. The contact of the pressure ring is at the lip portion contacting the piston rod and maintains this relationship with the lip and piston rod. The pressure ring 38 is normally urged against the beveled end of the packing 34 by a wave spring 42 which bears against the vertical inner face of the pressure ring. The opposite face of the wave spring bears at spaced intervals against a circular metal bushing 43 accurately dimensioned to fit into the intermediate portion of the stepped bore through the head and to bottom against a shoulder 44 between the intermediate portion and smaller portion 26 of the stepped bore.

The cylindrical bushing 43 has a minimum practical clearance with the cylinder head bore, the bushing outer surface 45 being smaller than the diameter of the intermediate bore portion by not more than about .010 of an inch. This is required to seal off the port passage from the seal assembly. The contact of bushing 43 on ledge 44 seals the seal assembly from the cylinder proper except for the port passage. Bushing to cavity clearance would not be critical where the inlet port enters the cylinder cavity on the cylinder side of the ledge 44. The inner surface 46 of the bushing provides a bearing for the piston rod; the clearances between the bushing and contiguous parts are held to a practical minimum and in general follow minimum clearances used for bearings and range from a clearance of .001" to .003" or slightly greater, depending on rod diameter. The bushing provides a block or barrier against ready communication between the interior of the cylinder and the space about the rod seal. Surfaces of the bushing are contiguous with the rod on the interior of the bushing and with the cylinder head on the exterior of the bushing. The contiguous surfaces form extremely narrow passageways between the interior of the cylinder and the area immediately about the rod seal structure through which surges of fluid flow do not occur.

Sudden severe pressure changes may be encountered in the cylinder. For example, some applications may produce a rapid drop in pressure in the cylinder although the pressure remains positive, i.e., from 3000 p.s.i. to 1000 p.s.i. Other applications may induce partial vacuum conditions within the cylinder. As a result of the very restricted passages past the bushing 43 between the interior of the cylinder and the space above the rod seal, hydraulic fluid pressure changes are slow to take place in the space about the piston rod seal even though there may be such a sudden severe drop in cylinder pressure. There thus cannot be any surging flow of hydraulic fluid about the rod seal sufficient to collapse the wave spring or oppose the urging of the wave spring which maintains the pressure ring 38 against the lip of the seal or which tends to disturb the pressure ring or sealing elements of the rod seal in any manner. The bushing provides for substantial longitudinal surface area in contiguous relationship with the head and piston rod so that the passageways are sufficient in length in comparison to their width to prevent pressure drops in the cylinder to momentarily adversely affect sealing effectiveness. As shown in FIGURE 3, the fluid port is partly opposite the bushing 43. In some sizes of cylinders the left-hand edge of the bushing, as viewed in FIGURE 2, may be exposed to the fluid port. In these instances an annular flange 47 may be provided to extend outwardly from the outer surface of the bushing 43 to increase the longitudinal surface area contiguous with the stepped bore in the head to block off such communication. In most sizes the skirt or flange 47 is not required as the bushing itself is of sufficient width to shut off communication around or over the bushing in the area of the port intersection with the stepped bore through the head.

The bushing 43 may be installed in existing piston and cylinder devices having the stepped bore through the head by changing the length of the lip 36 on the seal packing used in prior constructions. The length of the lip may be reduced from its former size to accommodate the length of the bushing 43 along the piston rod. In some cylinders that have been in service for several years, the rod seals may be replaced in the field if necessary. The parts of the rod seal fit upon the rod sufficiently closely that removal and replacement require the rod to be accurately held in a central position within the head. While such positioning may be accomplished with small cylinders without attendant difficulties, the larger sizes with heavy piston rods presented considerable difficulty prior to this invention. The present invention makes for ready and easier original installation as well as replacement of rod seals in the field since the first member to be placed in the head is the bushing 43. Once this bushing is in place in the intermediate bore section in the head, the rod of necessity is centered properly to receive the wave spring, pressure ring and rod seal packing. Even though the piston rod be quite heavy and cumbersome to handle, the bushing 43 centers the rod in the head allowing the other seal parts to slip over the rod to their proper assembly positions.

The foregoing detailed description is given for clearness of understanding only and no unnecessary limitations are to be understood therefrom, as modifications will be obvious to those skilled in the art.

I claim:

1. In a piston and cylinder device, a piston rod seal structure for a cylinder head comprising: a flexible annular packing ring mounted in the cylinder head having a lip portion slidably fitted about said piston rod for exposure to fluid pressure in the cylinder; and means in said head positioned between said ring lip portion and the interior of said cylinder, having exterior and interior surface areas respectively annularly contiguous with the inner surface of said cylinder head and the outer surface of said piston rod forming extremely narrow and elongated fluid flow blocking annular clearances defining throttling passages between said exterior and interior surface areas, said annular clearances being diametrically no greater than approximately .010 inch to permit static pressure in the interior of the cylinder to act on the packing ring while preventing the fluid surrounding said packing ring from surging toward the interior of the cylinder in response to a rapid severe cylinder pressure drop of up to approximately 2,000 p.s.i. whereby said packing ring sealing lip remains in efficient sealing operation during such pressure surges within the cylinder.

2. In a hydraulic cylinder, a piston rod seal structure for a cylinder head, comprising: a flexible annular packing ring mounted in the cylinder head and having a lip portion slidably fitted about said piston rod for exposure to fluid pressure in the cylinder; annular means about the piston rod yieldingly urging the lip portion of said packing into leaf-proof sealing engagement with the surface of said piston rod; and a bushing in said head between said annular urging means and the interior of said cylinder, said bushing having substantial longitudinal exterior and interior surface areas respectively contiguous with the inner surface of said cylinder head and the outer surface of said piston rod, said contiguous surface areas defining passages permitting static pressure in the interior of the cylinder to act on the packing ring while preventing the flow of hydraulic fluid between the cylinder interior and the space about said seal sufficiently to prevent rapid change in fluid pressure about said packing ring with rapid pressure drop within the cylinder of up to approximately 2,000 p.s.i. whereby said packing and urging means remain in efficient sealing operation during surges within the cylinder.

3. In a hydraulic cylinder, a piston rod seal structure for a cylinder head, comprising: a flexible annular packing ring mounted in the cylinder head having a lip portion slidably fitted about said piston rod for exposure to fluid pressure in the cylinder; annular means about the piston rod yieldingly urging the lip portion of said packing into leak-proof sealing engagement with the surface of said piston rod; and a stationary rigid bushing between said annular urging means and the interior of said cylinder, said bushing being fitted closely in said cylinder head and about said piston rod and having substantial longitudinal exterior and interior surface areas respectively annularly contiguous with the inner surface of said head and the outer surface of said piston rod, said contiguous surfaces forming extremely narrow clearance passageways communicating with the space surrounding said packing ring and urging means and with the interior of said cylinder to permit static pressure in the interior of the cylinder to act on the packing ring while preventing the rapid flow of hydraulic fluid therethrough sufficiently to prevent rapid changes in fluid pressure about said packing ring and urging means with a rapid severe pressure drop within the cylinder of up to approximately 2,000 p.s.i. whereby said packing ring and urging means remain in efficient sealing operation during pressure surges in the cylinder.

4. In a hydraulic cylinder, a piston rod seal structure for a cylinder head, comprising: a flexible annular packing ring mounted in the cylinder head having a lip portion slidably fitted about said piston rod for exposure to fluid pressure in the cylinder; annular means about the piston rod yieldingly urging the lip portion of said packing into leak-proof sealing engagement with the surface of said piston rod; and a stationary rigid bushing between said annular urging means and the interior of said cylinder, said bushing being fitted closely in said cylinder head and about said piston rod and having substantial longitudinal exterior and interior surface areas respectively annularly contiguous with the inner surface of said head and the outer surface of said piston rod, said contiguous surfaces forming extremely narrow clearance passageways communicating the space surrounding said packing ring and urging means with the interior of said cylinder to block rapid flow of hydraulic fluid therethrough sufficiently to prevent rapid changes in fluid pressure about said packing ring and urging means with a rapid severe pressure drop within the cylinder whereby said packing ring and urging means remain in efficient sealing operation during pressure surges in the cylinder, said cylinder head defining a fluid port communicating with said bore through the head so as to intersect said bushing, and said bushing having an annular flange extending rearwardly from its outer surface to provide substantial longitudinal surface area adjacent said port contiguous with the cylinder head to block direct communication between the port and the space about said packing ring and urging means.

5. In a hydraulic cylinder, a piston rod seal structure for a cylinder head, comprising: an annular packing ring mounted in the cylinder head having a beveled front end exposed to fluid pressure in the cylinder; a pressure ring having a beveled interior end facing the beveled front end of said packing and in engagement therewith; means yieldingly urging the pressure ring against the packing and the beveled end of said packing ring into leak-proof sealing engagement with the surface of said piston rod; and a stationary bushing in said head adjacent and forward of said urging means having substantial longitudinal exterior and interior surface areas respectively annularly contiguous with the inner surface of said cylinder head and the outer surface of said piston rod, said contiguous surface areas defining passages permitting static pressure in the interior of the cylinder to act on the packing ring while preventing the flow of hydraulic fluid between the cylinder interior and the space about said seal sufficiently to prevent rapid change in fluid pressure about said packing ring with rapid pressure drop within the cylinder of up to approximately 2,000 p.s.i. whereby said packing and urging means remain in efficient sealing operation during pressure surges within the cylinder.

6. In a high pressure hydraulic cylinder, a seal for a piston rod and the like adapted to reciprocate through the head of said cylinder, comprising: a flexible flanged annular packing ring having a lip portion extending along the piston rod to make a close sliding fit with said piston rod, said packing ring having a beveled extremity forming a relatively thin lip against the piston rod; a pressure ring having a beveled rear face engaging the beveled end of said packing at said lip; a wave spring yieldingly urging said pressure ring toward and against the beveled end of the packing ring to press the lip thereof against the piston rod thereby sealing the same against leakage of high pressure hydraulic fluid past the packing ring and wiping the piston rod dry as the rod reciprocates through the packing; and a stationary rigid bushing adjacent and forward of said wave spring with said wave spring engaging the outer side of the bushing, said bushing having substantial longitudinal surface area respectively annularly contiguous with the inner surface of said cylinder head and the outer surface of said piston rod defining passages permitting static pressure in the interior of the cylinder to act on the packing ring while preventing the flow of hydraulic fluid between the interior of the cylinder and the space about the piston rod seal preventing rapid pressure drops about the rod seal tending to move the wave spring and pressure ring away from the packing ring seal lip.

7. In a piston and cylinder device, a piston rod seal structure for a cylinder head, comprising: a flexible annular packing ring mounted in the cylinder head having a lip portion slidably fitted about said piston rod for exposure to fluid pressure in the cylinder; and removable means about the piston rod forming walls between the interior of said cylinder and the area around said packing ring and being fitted in a manner to form extremely narrow and elongated fluid flow blocking clearances defining throttling passages adjacent the inner surface of said cylinder head and the outer surface of said piston rod to prevent fluid surges around said packing ring sealing lip insuring that said packing ring sealing lip remains in efficient sealing operation during pressure surges of up to approximately 2,000 p.s.i. within the cylinder.

References Cited in the file of this patent

UNITED STATES PATENTS

| | | |
|---|---|---|
| 890,808 | Smith | June 16, 1908 |
| 2,537,425 | Rossman | Jan. 9, 1951 |
| 2,757,993 | Flick | Aug. 7, 1956 |
| 2,957,712 | Farmer | Oct. 25, 1960 |